2,713,263

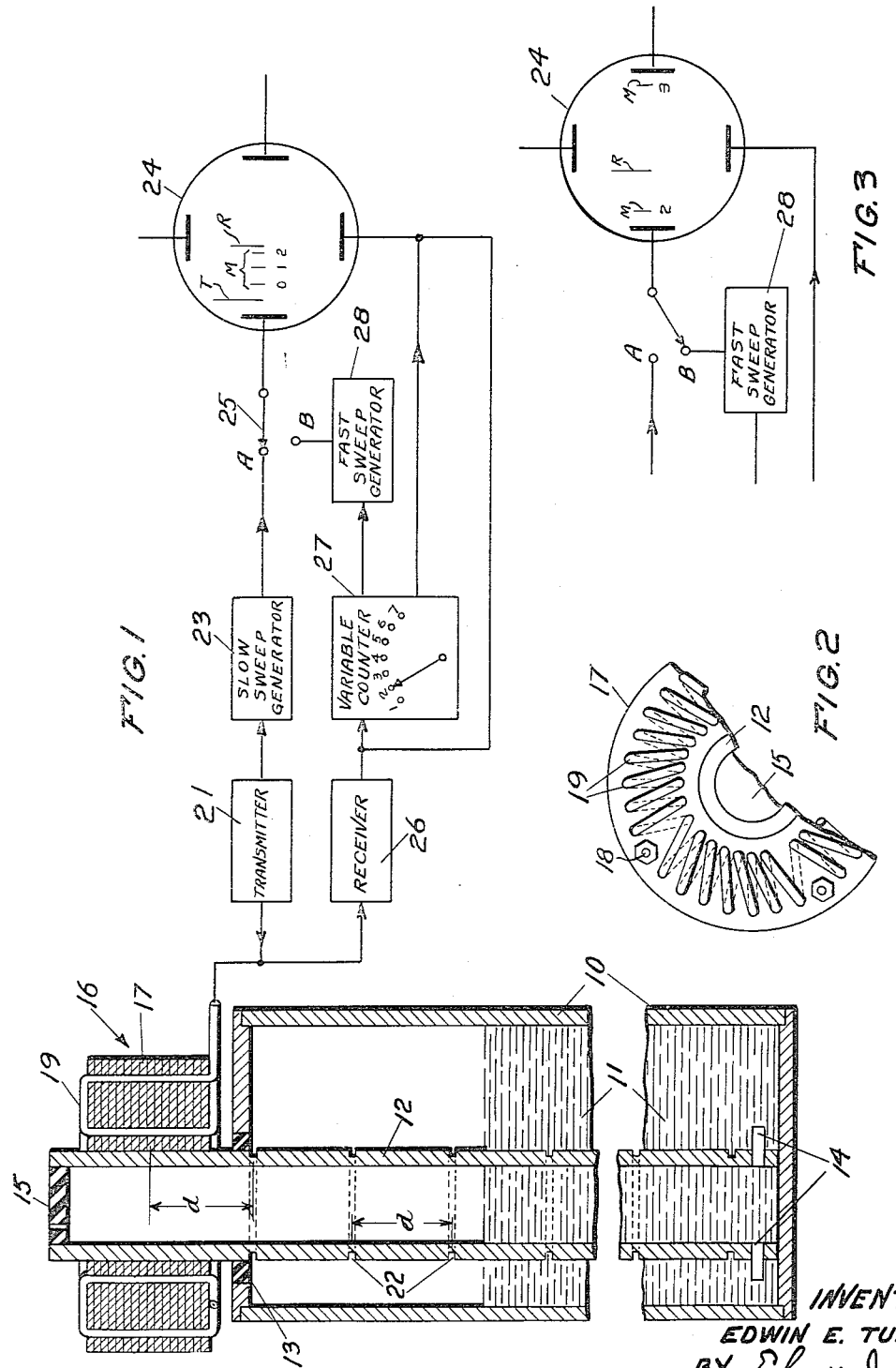

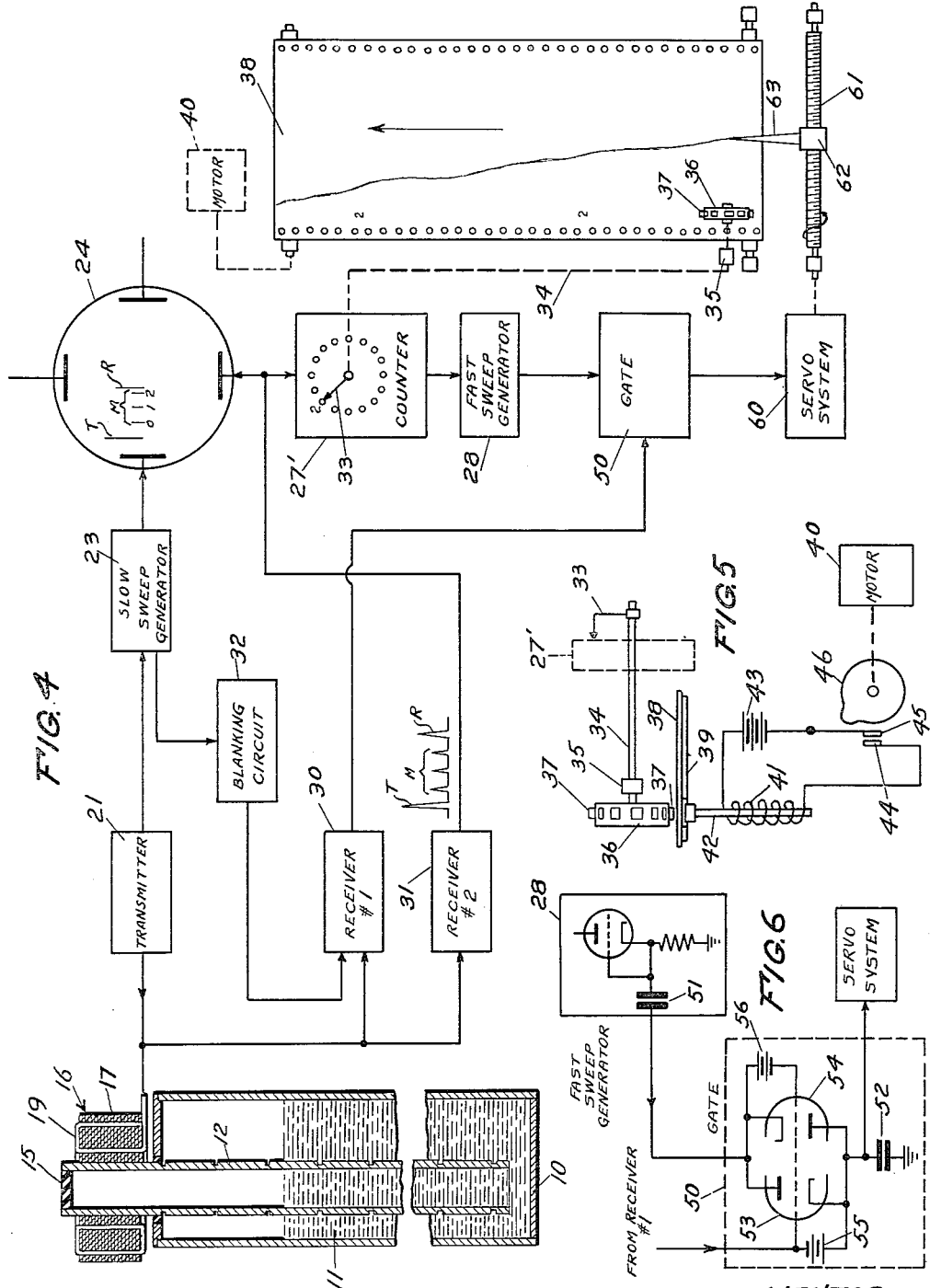

ULLAGE MEASURING DEVICES

Edwin E. Turner, West Roxbury, Mass., assignor to Raytheon Manufacturing Company, Newton, Mass., a corporation of Delaware Application July 7, 1952, Serial No. 297,589

12 Claims. (Cl. 73—290)

This invention relates to a device for measuring the ullage of a vessel containing a liquid medium.

One method of measuring the ullage of a tank containing a liquid, such as oil, water or the like, has been to produce a sound wave near the top of the tank and to measure the length of time taken for the sound wave traversing the air space occupied by the unfilled portion of the tank to return after reflection from the surface of the liquid. This method is subject to errors arising in part from a variation in the speed of propagation of sound with temperature and density of the air in the tank and partly to inaccuracies inherent in echo sound apparatus when the distances involved are relatively small, as is the case with tanks of practical size.

In accordance with this invention, the ullage is measured by means of a pipe of suitable diameter inserted within the tank through an elastic gasket so that the upper end extends exteriorly of said tank and the lower end lies at or near the bottom of the tank. A transducer tuned to the natural period of radial vibration of said pipe is mounted at or near the upper end and is periodically energized by a suitable source of alternating current pulses so that radial compressional wave vibrations are induced in the pipe which travel longitudinally down the pipe. The pipe is preferably made of material such as Invar having a substantially zero temperature coefficient of expansion so that the velocity of propagation of said radial vibrations is constant regardless of ambient temperature. On striking the surface of the liquid, these radial vibrations are reflected backward along the pipe owing to the inhibition of the radial vibrations of the pipe at the point of contact with the liquid surface.

The reflected vibrations are converted at the transducer into electrical impulses or echoes which are fed into a receiver. The output of the receiver is then applied to one set of deflecting means of a cathode ray tube indicator while a slow-sweep voltage triggered from the transmitter is applied to the other set of deflecting means.

A series of equally-spaced radial slots or notches are cut in one wall of the pipe. A portion of the energy traveling down the pipe is reflected from each of these slots lying above the surface of the liquid. The reflected energy from these discontinuities is converted into electrical pulses which, after reception in the receiver and application to the indicator, appear as calibration markers on said indicator. For example, the radial slots may be so spaced along the pipe that the interval between successive markers on said indicator corresponds to a predetermined distance.

In order to obtain a more accurate indication of the tank ullage, the order number of the calibration marker pulse immediately preceding the echo pulse on the indicator is noted and the slow-sweep generator is disconnected from the indicator. The output of the receiver is then connected through a manually variable counter circuit and a fast-sweep generator to the indicator. The counter circuit is set to count the number of marker pulses corresponding to the number of calibration markers preceding the echo impulse while the slow-sweep generator was connected to the indicator. The counter circuit is initiated by the transmitter pulse and, after a predetermined time dependent upon the setting of the counter, the fast-sweep generator is triggered and the portion of the original sweep lying between the two range marker pulses surrounding the echo impulse is expanded to occupy substantially the entire face of the indicator. By means of a calibrated scale on said indicator the ullage of the tank may be determined to a fraction of an inch. Accuracy of one part in five thousand has been obtained by the subject invention.

In some cases, it is desirable to record the ullage of the tank in order to obtain a permanent record for future use. This may be accomplished by a modification of the system just described. The impulse-receiving means now comprises two receivers, the first of which is biased so as to pass only the echo impulses from the surface of the liquid while the second receiver is similar to that of the previous system. The output of the second receiver is applied to the cathode ray tube and the counter circuit for initiation of the fast sweep as in the previous system. The output of the first receiver is adapted to open a gate circuit interposed between the fast-sweep generator and a servo system connected to recorder movement. A dial on the counter is set manually to count the number of marker pulses equal to the number of said impulses visible on the indicator. A recording drum having a plurality of inked embossed numerals on the periphery thereof is mechanically ganged to the counter dial and is caused to engage the recorder chart periodically so that a number corresponding to the position of the counter dial is imprinted on the chart. The numeral so printed provides a rough indication of the tank ullage. The fine indication of ullage is recorded by means of a stylus mounted on the aforesaid recorder movement.

In the drawings:

Fig. 1 is a diagrammatic view of a first embodiment of the subject invention;

Fig. 2 is a plan view of the transducer used in the system of Fig. 1;

Fig. 3 is a view illustrating the presentation on the indicator of Fig. 1 resulting from the use of an expanded sweep circuit;

Fig. 4 is a diagrammatic view of the second embodiment of the subject invention;

Fig. 5 is a detailed view of a portion of the recorder used in the system of Fig 4; and Fig. 6 is a schematic diagram of a portion of the system of Fig. 4.

In Fig. 1, a tank whose ullage is to be measured is shown partially filled with a liquid 11. The tank may be of any desired size or shape and may be either open at the top or entirely closed as shown in Fig. 1.

A tube or pipe 12 is inserted within tank 10, preferably along one edge thereof. One end of pipe 12 extends beyond the top of the tank through an elastic gasket 13 which is cemented or otherwise secured to both the top of the tank and the pipe. Gasket 13 may be made of rubber or similar flexible material so that the pipe is not rigidly clamped by the top portion of the enclosed tank.

The bottom end of pipe 12 is either connected to the bottom of the tank or spaced a short distance from the bottom. If the tank is welded to the bottom of the tank in order to provide more adequate support, it is necessary to place vents 14 near the bottom of the pipe so that the liquid 11 may rise therein. The top end of pipe 12 is preferably closed off by a rubber closure member 15 having an aperture or apertures therein which are large enough to allow the flow of air while small enough to prevent the ingress of foreign matter.

A well damped transducer 16 capable of converting electrical impulses into radial compressional wave vibrations and vice versa and tuned to the actual period of radial vibration of pipe 12 is mounted at or near the upper end of said pipe as shown in Figs. 1 and 2. The transducer shown is of the magnetostrictive type although a crystal transducer may alternatively be employed. Transducer 16 includes a body portion 17 comprising a stack of laminations which together form a hollow cylinder. These laminations are made of nickel or any other material having suitable magnetostrictive properties. The laminations may be held together by bolts 18 (see Fig. 2) passing through holes located near the periphery of the laminations. The laminated stack is wound with a toroidal winding 19 which passes through other aligned holes in the various laminations. The inner periphery of the transducer may be securely attached to the outer wall of pipe 12 by shrinking the pipe by pre-cooling, positioning the transducer at the desired position along the pipe and allowing the pipe to return to its original ambient temperature.

A pulse transmitter 21 connected to the winding 19 of transducer 16 serves to energize the transducer at periodical intervals dependent upon the depth of the tank; that is, the pulse rate of transmitter 21 should be at least equal to the time interval necessary for the compressional wave energy to traverse the entire length of the pipe and back to the transducer.

When the winding 19 of magnetostrictive transducer 16 is energized by the pulses derived from transmitter 21, the laminated body 17 expands and contracts radially. This variattion in cross section of the transducer causes radial compressional wave vibrations to be produced at the top of the pipe; these vibrations then travel along the pipe at a speed dependent upon the material of which the pipe is made and upon the temperature coefficient of expansion of said pipe. If the pipe is made of Invar or any other material having a substantially zero temperature coefficient of expansion, the velocity of propagation along the pipe will be independent of temperature, and, thus, constant for a given length of pipe.

These compressional wave vibrations in the wall of the pipe continue down the pipe until they strike the surface of the liquid in the tank. The liquid interface inhibits further propagation of the radial vibrations and the latter are reflected from the interface back along the pipe toward the transducer. The transducer converts the reflected radial vibrations back into electrical echo impulses, one for each pulse produced by transmitter 21.

It is possible to use a magnetostrictive transducer which may be set into resonant longitudinal vibrations instead of the radial type transducer shown in Figs. 1 and 2. It has been found, however, that longitudinal compressional wave vibrations are not as well damped by the liquid interface as radial vibrations but have a great tendency to continue through the liquid to the bottom of the pipe. In order to obtain definite sharp echoes, a system employing radial vibrations is therefore preferable to one utilizing longitudinal vibrations.

A plurality of equally-spaced radial slots 22 is formed in the wall of pipe 12 for calibration purposes, as will be explained subsequently. These slots provide sufficient discontinuities in the transmission path to permit reflection of radial vibrations from those of said slots which lie above the liquid interface. The amplitude of the received calibration marker pulses owing to reflections from these slots is smaller than the main echo impulse received from the liquid surface so that the main echo impulse is not confused with the calibration marker impulses. The amplitude of these calibration marker impulses is determined by the size of slots 22.

Coincident with the energization of transducer 16 by transmitter 21, a slow-sweep generator 23 is triggered into operation by this same transmitter so that the slow-sweep voltage produced by sweep generator 23 is synchronized with the transmitter pulse. The slow-sweep voltage is adapted to be connected to the horizontal deflecting plates of a cathode ray tube indicator 24 when the arm of switch 25 is in position A.

The electrical impulses from transducer 16 are applied to a receiver 26 whose output, in turn, is fed to the vertical deflecting plates of cathode ray tube indicator 24. The visual presentation on the face of indicator 24, as shown in Fig. 1, includes a large pulse T representing the transmitter pulse received by receiver 26, a series if calibration marker pulses M resulting from reflections of compressional wave energy from the several calibration slots 22 lying above the surface of liquid 11 and a main echo impulse R resulting from reflections from the liquid surface. With the liquid level, as shown in Fig. 1, the compressional wave energy traveling along pipe 12 must encounter three radial slots 22 before arriving at the liquid surface. The first of these slots is positioned adjacent the top of tank 10 and corresponds to an ullage of zero feet. If the distance between adjacent slots is assumed to be equal to one foot, for example, the second slot corresponds to an ullage of one foot, the third slot to an ullage of two feet, and so forth. The position of echo pulse R on indicator 24 of Fig. 1 thus indicates the ullage to be somewhat in excess of two feet.

In order to obtain greater accuracy in the indication of ullage, resort is had to an expanded sweep circuit which will now be described.

The output of receiver 26 is applied to a variable counter circuit 27 which may be any type of electrical counter in which the number of pulses counted is preset by a manually operated switch having a plurality of contacts each connected to a separate electron discharge device. Such counters are well known in the art and need not be described in detail. The switch on counter 27 is set to a position corresponding to the number of calibration markers M preceding the echo pulse R. The number of contacts on counter 27 depends upon the number of calibration notches in pipe 12, and is not necessarily limited to seven contacts, as shown in Fig. 1. If indicator 24 is provided with a scale, the first marker pulse M would be aligned with the zero point on the scale so that the reading on the scale opposite the marker pulse adjacent echo pulse R would provide the operator with the setting for the counter switch. In other words, if the marker pulses on the indicator lie opposite scale markings 0, 1, 2, 3 and so forth, the counter dial settings may also be calibrated as 0, 1, 2, 3 and so on. It is also possible to calibrate the counter dial starting with 1, in which case two pulses would be counted with the counter dial set at position 1.

Counter 27 is so biased that a pulse greater in amplitude than the calibration marker pulses is required to initiate the counting operation. In this way, possible confusion as to which of the several marker pulses is initiating the counter is avoided. Counter 27 is fired by the transmitter pulse T received by receiver 26. Transducer 16 is so mounted that the time interval between pulse T and the zero marker pulse is equal to the interval between adjacent marker pulses.

After a predetermined time, dependent upon the setting of counter 27, a fast-sweep generator 28 is triggered by the output from said counter. The circuit constants of sweep generator 28 are such that the output voltage derived therefrom increases at a much faster rate than that of sweep generator 23.

By moving the arm of switch 25 to position B, the slow-sweep voltage is removed from indicator 24 and the fast sweep voltage initiated by the output pulse derived from counter 27 is applied to the indicator. The portion of the total slow sweep of indicator 24 lying between two adjacent marker pulses surrounding echo impulse R is thus expanded to cover the entire face of the indicator, as shown in Fig. 3. The interval between the calibration markers may be calibrated into fractions of a foot by means of a vernier scale and, by observing the position on the scale opposite echo impulse R, a very accurate indication of ullage may be obtained. For instance, the ullage as indicated on the face of indicator 24 of Fig. 3 is two feet, four inches.

In Fig. 4 a system for recording the ullage of tank 10 is shown. The elements of Fig. 4 which correspond to those of Fig. 1 are represented by the same reference numerals.

The transmitter 21 of Fig. 4 simultaneously energizes transducer 16 and slow-sweep generator 23, just as in the system of Fig. 1. As in Fig. 1, the slow-sweep generator 23 of Fig. 4 is applied to the horizontal deflection plates of indicator 24.

The system of Fig. 4 employs two receivers 30 and 31. The output of sweep generator 23 causes a blanking signal to be generated in a blanking circuit 32; this blanking signal is applied to the first receiver 30 to render said receiver inoperative during the presence of the transmitted pulse. During the remainder of the cycle, the reception of the relatively weak calibration marker pulses is prevented by application of sufficient negative biasing voltage to the input circuit of receiver 30. This biasing voltage may be overcome only by the strong main echo impulse R so that only the latter is available at the output of receiver 30.

The second receiver 31, like receiver 26 in Fig. 1, is receptive of the transmitter impulse T and the calibration marker impulses M as well as the main echo impulse R. The output of receiver 31 is connected to the vertical deflecting plates of indicator 24 and to counter circuit 27'.

The presentation on indicator 24 of Fig. 4 is like that appearing on indicator 24 of Fig. 1. In the example shown, an approximate ullage in excess of two feet is indicated. The operator then sets the pointer 33 of counter 27' to the contact marker 2. The pointer 33 is mounted on a shaft 34 supported by one or more bearings 35 as shown in Fig. 5. Mounted on the same shaft is a drum 36 capable of carrying a supply of ink and having a plurality of embossed numerals 37 arranged around the periphery. The angular spacing of numerals 37 about the drum is equal to the angular spacing of the dial contacts of counter 27'. Drum 36 is positioned just above the chart paper 38 of a recorder. The chart paper is driven over a rigid platen 39 at a substantially constant speed by a drive motor 40.

A printing control circuit for printing numerals on chart 38 is shown in Fig. 5 and comprises a solenoid 41 and a solenoid-actuated plunger 42; the solenoid is adapted to be periodically energized from a battery 43 upon closure of switch contacts 44 and 45 by motor driven cam 46. The same motor 40 may be used to drive cam 46 as is used to drive the recorder chart paper. At predetermined intervals, the projecting portion of cam 46 strikes movable contact 45 forcing it against stationary contact 44. The solenoid is thereby energized for a short period of time actuating plunger 42. Plunger 42 is driven upward through a small circular aperture in platen 39 and forces chart paper 38 into temporary contact with one of the inked numerals 37 corresponding to a particular setting of the dial pointer 33 of counter 27'. So long as the echo impulse R appears between the scale markings 2 and 3 on indicator 24, the pointer 33 of counter 27' is left on contact "2." During the time at which the echo impulse R appears between scale markings 2 and 3—which, of course, may be quite extensive if the liquid level in the tank is changing slowly—the printing counter circuit will be periodically operated to print a series of spaced figures 2 along the edge of chart 38. When the echo impulse R moves past the calibration marker pulse corresponding to the scale marking 3, the counter pointer must be manually set to be contact marked 3 and so forth.

In order to obtain a vernier recording of the tank ullage, the output of the first receiver 30 is applied to an electronic switch or gate circuit 50 together with the output of fast-sweep generator 28 energized by the electrical output derived from counter 27'.

At the time coincident with the reception of the particular marker pulse immediately preceding the echo impulse R a fast sweep is initiated by sweep generator 28. As shown in Fig. 6, the linear saw tooth voltage appearing across capacitor 51 of sweep generator 28 is applied across a measuring capacitor 52 in the normally closed gate 50 and ground.

Gate 50 comprises a pair of triode sections 53 and 54 connected back-to-back in the circuit to measuring capacitor 52. A pair of biasing batteries 55 and 56 normally bias the triodes in which they are connected to cutoff, thereby keeping gate 50 normally opened. The receiver output signal, in the form of received echo impulse R, is connected to the grids of both triode sections so that during the presence of said echo impulse R the grids of both sections are driven sufficiently positive in relation to their respective cathodes to overcome the bias provided by batteries 55 and 56, respectively. One or the other triode sections conducts depending upon which of the two capacitors 51 and 52 are at the higher potential with respect to ground at the time when echo impulse R is applied to gate 50. For example, if the capacitor 51 in sweep generator 28 is charged more positively than measuring capacitor 52 of gate 50 at the instant of closure of said gate by echo impulse R, triode section 53 is rendered conductive whereas, if the potential on measuring capacitor 52 is more positive than that on sweep capacitor 51 at the instant of closure, triode section 54 becomes conductive. In either event measuring capacitor 52 is temporarily connected to sweep capacitor 51 and assumes the same potential level above ground.

If the tank ullage is increasing, each received echo impulse will render gate 50 conductive through triode section 53 since the sweep voltage is increasing with time. On the other hand, if the ullage is decreasing, triode 54 will become conductive since measuring capacitor 52 will then be charged more positively than sweep capacitor 51. If there is no change in the ullage between successive received echo impulses, neither triode section will conduct since the respective anodes and cathodes of both tubes will be at the same potential.

A voltage appearing across capacitor 52 is applied to a conventional servo system 60 which provides the rotary mechanical movement proportional to an electrical input voltage.

The output of servo system 60 imparts a rotary motion to threaded feed screw 61 on the indicator suitably journaled as illustrated schematically. The feed screw drives a stylus nut 62 to which a recording stylus 63 is attached for engagement with chart 38.

The position of the stylus across chart 38 is directly proportional to the time interval between the initiation of the fast sweep by the calibration marker impulse immediately preceding the echo impulse and the arrival of the echo impulse. By suitably calibrating the recorder chart an indication of the distance between the liquid surface and the calibration slot immediately above said surface is obtainable. The recorder chart may be driven by motor 40 at a known rate of speed and the chart calibrated in suitable units of time such as hours, half hours and so on.

The numeral imprinted along the edge of the recorder chart and the position of the line traced by the stylus corresponding to a given time provide a permanent record of the tank ullage at any desired instant of time.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. An ullage indicating device comprising a vessel adapted to contain a fluid medium, an elongated member positioned within said vessel and having a plurality of equally-spaced discontinuities formed therein, a transducer mounted at one end of said member, a source of electrical energy connected to said transducer for producing compressional wave vibrations in said member which propagate along said member toward the other end thereof, said transducer being adapted to convert said vibrations into electrical impulses after reflection from the surface of said fluid medium and from said discontinuities, means for receiving said electrical impulses, a slow-sweep generator, an indicator responsive to said received impulses and to the output of said slow-sweep generator for producing a visual presentation of said received impulses thereon, those of said impulses resulting from reflections from said discontinuities appearing as a series of accurately spaced calibration markers on said indicator for indicating the approximate ullage of said vessel corresponding to the position on said indicator of said impulses resulting from reflections from said fluid surface, means for counting a predetermined number of said calibration markers and a fast-sweep generator responsive to the output of said counting means for initiating an expanded sweep which provides a vernier indication of the ullage of said vessel.

2. An ullage indicating device comprising a vessel adapted to contain a fluid medium, an elongated member positioned within said vessel and having a plurality of equally-spaced discontinuities formed therein, a transducer mounted at one end of said member externally of said vessel, a source of electrical energy connected to said transducer for producing radial compressional wave vibrations in said member which propagate along said member toward the other end thereof, said transducer being adapted to convert said radial vibrations into electrical impulses after reflection from the surface of said fluid medium and from said discontinuities lying above said surface, means for receiving said electrical impulses, a slow-sweep generator, an indicator responsive to said received impulses and to the output of said slow-sweep generator for producing a visual presentation of said received impulses thereon, those of said impulses resulting from reflections from said discontinuities appearing as a series of accurately spaced calibration markers on said indicator for indicating the approximate ullage of said vessel corresponding to the position on said indicator of said impulses resulting from reflections from said fluid surface, means for counting a predetermined number of said calibration markers and a fast-sweep generator responsive to the output of said counting means for initiating an expanded sweep which provides a vernier indication of the ullage of said vessel.

3. An ullage indicating device comprising a vessel adapted to contain a fluid medium, an elongated member positioned within said vessel and having a plurality of equally-spaced discontinuities formed therein, a transducer mounted at one end of said member, a source of electrical energy connected to said transducer for producing compressional wave vibrations in said member which propagate along said member toward the other end thereof, said transducer being adapted to convert said vibrations into electrical impulses after reflection from the surface of said fluid medium and from said discontinuities, means for receiving said electrical impulses, a slow-sweep generator, an indicator responsive to said received impulses and to the output of said slow-sweep generator for producing a visual presentation of said received impulses thereon, those of said impulses resulting from reflections from said discontinuities appearing as a series of accurately spaced calibration markers on said indicator for indicating the approximate ullage of said vessel corresponding to the position on said indicator of said impulses resulting from reflections from said fluid surface, counting means for counting the number of said calibration markers appearing on said indicator, a recorder having a chart driven at a predetermined speed and a stylus in contact with said chart, means mechanically coupled to said counting means for imprinting the approximate ullage on said recorder chart, a fast-sweep generator responsive to the output of said counting means for initiating a voltage waveform which increases substantially linearly with respect to time, an electronic switch energized by said voltage waveform and opened by said impulses resulting from reflections from said fluid surface for deriving an output voltage dependent upon the time of arrival of said latter impulses, and a servo system electrically connected to said electronic switch and mechanically connected to said recorder stylus for producing a vernier indication of the ullage of said vessel.

4. An ullage indicating device comprising a vessel adapted to contain a fluid medium, a hollow tubular member positioned within said vessel and having a plurality of equally-spaced radial slots formed therein, a transducer mounted at one end of said tubular member externally of said vessel, a source of electrical energy connected to said transducer for producing radial compressional wave vibrations in said tubular member which propagate longitudinally toward the other end of said tubular member, said transducer being adapted to convert said radial vibrations into electrical impulses after reflection from the surface of said fluid medium and from said radial slots, means for receiving said electrical impulses, a slow-sweep generator, an indicator responsive to said received impulses and to the output of said slow-sweep generator for producing a visual presentation of said received impulses thereon, those of said impulses resulting from reflections from said slots appearing as a series of accurately spaced calibration markers on said indicator for indicating the approximate ullage of said vessel corresponding to the position on said indicator of said impulses resulting from reflections from said fluid surface, counting means for counting the number of said calibration markers appearing on said indicator, a recorder having a chart driven at a predetermined speed and a stylus in contact with said chart, means mechanically coupled to said counting means for imprinting the approximate ullage on said recorder chart, a fast-sweep generator responsive to the output of said counting means for initiating an expanded sweep, an electronic switch energized by said expanded sweep and opened by said impulses resulting from reflections from said fluid surface for deriving an output voltage dependent upon the time of arrival of said latter impulses, and a servo system electrically connected to said electronic switch and mechanically connected to said recorder stylus for producing a vernier indication of the ullage of said vessel.

5. A device for measuring the ullage of a vessel containing a fluid medium comprising a member positioned within said vessel and having a plurality of equally-spaced discontinuities formed therein, a transducer mounted adjacent one end of said member, a transmitter connected to said transducer for producing compressional wave vibrations in said member which propagate along said member toward the other end thereof, said transducer being adapted to convert said vibrations into electrical impulses after reflection from the surface of said fluid medium and from said discontinuities which lie above said surface, a first sweep generator, indicating means responsive to said received impulses and to the output of said first-sweep generator for producing a first visual presentation of said received impulses thereon including a series of accurately spaced calibration markers whose spacing corresponds to the distances between said discontinuities and an echo marker representative of the approximate ullage of said vessel, counting means energized by the output of said transmitter for counting a number of pulses equal to the number of said calibration markers appearing on said indicating means, said counting means including a switch whose position determines the number of pulses to be counted, means for initiating an expanded sweep voltage at a predetermined time after energization of said counting means dependent upon the position of said switch, said indicating means being further responsive to said received pulses and said expanded sweep voltage for providing a second visual presentation from which said ullage may be accurately obtained.

6. A device for measuring the ullage of a vessel containing a fluid medium comprising a member positioned within said vessel and having a plurality of equally-spaced discontinuities formed therein corresponding to predetermined distances along said vessel, transmitting means for producing wave vibrations adjacent one end of said member which travel longitudinally along said member toward the other end thereof, first receiving means responsive only to those of said vibrations which are reflected from said surface, second receiving means for receiving the vibrations produced by said transmitting means as well as the vibrations reflected from said surface and from those of said discontinuities which lie above said surface, a first sweep generator, indicating means for providing a visual presentation thereon including a series of calibration markers whose spacing corresponds to the distances between said discontinuities and an echo marker representative of the approximate ullage of said vessel, counting means energized only by said vibrations produced by said transmitting means for counting a number of pulses equal to the number of said calibration markers appearing on said indicating means, said counting means including a switch whose position determines the number of pulses to be counted, means for initiating an expanded sweep voltage at a predetermined time after energization of said counting means dependent upon the setting of said counting means, a recorder including a motor-driven chart and a stylus cooperating with said chart, means mechanically coupled to said switch for imprinting on said chart the number of said count and, hence, the approximate ullage of said vessel, circuit means receptive of said sweep voltage and responsive to the output of said first receiving means for deriving a control signal, means responsive to said control signal and mechanically connected to said stylus for providing a vernier indication of said tank ullage.

7. A device for measuring the ullage of a vessel containing a fluid medium comprising a member positioned within said vessel and having a plurality of equally-spaced discontinuities formed therein, a transducer mounted adjacent one end of said member, a transmitter connected to said transducer for producing compressional wave vibrations in said member which propagate along said member toward the other end thereof, said transducer being adapted to convert said vibrations into electrical impulses after reflection from the surface of said fluid medium and from said discontinuities which lie above said surface, a first sweep generator, indicating means responsive to said received impulses and to the output of said first sweep generator for producing a visual presentation of said received impulses thereon including a series of accurately spaced calibration markers whose spacing corresponds to the distances between said discontinuities and an echo marker representative of the approximate ullage of said vessel, counting means energized only by the output of said transmitter for counting a number of pulses equal to the number of said calibration markers appearing on said indicating means, said counting means including a switch whose position determines the number of pulses to be counted, means for initiating an expanded sweep voltage at a predetermined time after energization of said counting means, a recorder including a motor-driven chart and a stylus cooperating with said chart, means mechanically coupled to said switch for imprinting on said chart the number of said count and, hence, the approximate ullage of said vessel, a coincidence circuit receptive of said sweep voltage and responsive to the output of said first receiving means for deriving a control signal, means responsive to said control signal and mechanically connected to said stylus for providing a vernier indication of said tank ullage.

8. A device for measuring the ullage of a vessel containing a fluid medium comprising a member positioned within said vessel and having a plurality of equally-spaced discontinuities formed therein, a transducer mounted adjacent one end of said member, a transmitter connected to said transducer for producing radial compressional wave vibrations in said member which propagate along said member toward the other end thereof, said transducer being adapted to convert said vibrations into electrical impulses after reflection from the surface of said fluid medium and from said discontinuities which lie above said surface, a first sweep generator, indicating means responsive to said received impulses and to the output of said first sweep generator for producing a visual presentation of said received impulses thereon including a series of accurately spaced calibration markers whose spacing corresponds to the distances between said discontinuities and an echo marker representative of the approximate ullage of said vessel, counting means energized only by the output of said transmitter for counting a number of pulses equal to the number of said calibration markers appearing on said indicating means, said counting means including a switch whose position determines the number of pulses to be counted, means for initiating an expanded sweep voltage at a predetermined time after energization of said counting means, a recorder including a motor-driven chart and a stylus cooperating with said chart, means mechanically coupled to said switch for imprinting on said chart the number of said count and, hence, the approximate ullage of said vessel, a coincidence circuit receptive of said sweep voltage and responsive to the output of said first receiving means for deriving a control signal, means responsive to said control signal and mechanically connected to said stylus for providing a vernier indication of said tank ullage.

9. An ullage indicating device comprising a vessel adapted to contain a fluid medium, a hollow tubular member positioned within said vessel and having a plurality of equally spaced radial slots formed therein, a source of energy mounted at one end of same tubular member for producing wave vibrations in said tubular member which propagate along said member toward the other end thereof, means for receiving said vibrations after reflection from the surface of said fluid medium and from said slots, a slow-sweep generator, an indicator responsive to said received vibrations and to the output of said slow-sweep generator for producing a visual presentation of said received vibrations thereon, those of said vibrations resulting from reflections from said slots appearing as a series of accurately spaced calibration markers on said indicator for indicating the approximate ullage of said vessel corresponding to the position on said indicator of said vibrations resulting from reflections from said fluid surface, means for counting a predetermined number of said calibration markers and a fast-sweep generator responsive to the output of said counting means for initiating an expanded sweep which provides a vernier indication of the ullage of said vessel.

10. An ullage indicating device comprising a vessel adapted to contain a fluid medium, a hollow tubular member positioned within said vessel and having a plurality of equally-spaced radial slots formed therein, a source of energy mounted at one end of said tubular member for producing wave vibrations in said tubular member which propagate along said tubular member toward the other end thereof, means for receiving said vibrations after reflection from the surface of said fluid medium and from said radial slots, a slow-sweep generator, an indicator responsive to said received vibrations and to the output of said slow-sweep generator for producing a visual presentation of said received vibrations thereon, those of said vibrations resulting from reflections from said slots appearing as a series of accurately spaced calibration markers on said indicator for indicating the approximate ullage of said vessel corresponding to the position on said indicator of said vibrations resulting from reflections from said fluid surface, counting means for counting the number of said calibration markers appearing on said indicator, a recorder having a chart driven at a predetermined speed and a stylus in contact with said chart, means mechanically coupled to said counting means for imprinting the approximate ullage on said recorder chart, a fast-sweep generator responsive to the output of said counting means for initiating a sawtooth waveform, an electronic switch engaged by said sawtooth waveform and opened by said vibrations resulting from reflections from said fluid surface for deriving an output voltage dependent upon the time of arrival of said latter vibrations, and a servo system electrically connected to said electronic switch and mechanically connected to said recorder stylus for producing a vernier indication of the ullage of said vessel.

11. A device for measuring the ullage of a vessel containing a fluid medium comprising a member positioned within said vessel and having a plurality of equally-spaced discontinuities formed therein, a transducer mounted adjacent one end of said tubular member, a transmitter connected to said transducer for producing wave vibrations in said tubular member which propagate along said tubular member toward the other end thereof, means for receiving said vibrations after reflection from the surface of said fluid medium and from said discontinuities which lie above said surface, a first-sweep generator, indicating means responsive to said received vibrations and to the output of said first-sweep generator for producing a first visual presentation of said received vibrations thereon including a series of accurately spaced calibration markers whose spacing corresponds to the distances between said discontinuities and an echo marker representative of the approximate ullage of said vessel, counting means energized by the output of said transmitter for counting a number of pulses equal to the number of said calibration markers appearing on said indicating means, said counting means including a switch whose position determines the number of pulses to be counted, means for initiating an expanded sweep voltage at a predetermined time after energization of said counting means dependent upon the position of said switch, said indicating means being further responsive to said received pulses and said expanded sweep voltage for providing a second visual presentation from which said ullage may be accurately obtained.

12. An ullage indicating device comprising a vessel adapted to contain a fluid medium, an elongated member positioned within said vessel and having a plurality of equally spaced discontinuities therein, transducer means mounted at one end of said member, electrical energy generating means connected to said transducer means for producing compressional wave vibrations in said elongated member which propagate along said member toward the other end thereof, said transducer means converting said vibrations into electrical impulses after reflection from the surface of said fluid medium and from said discontinuities, means for receiving said electrical impulses, counting means settable to produce an output upon receipt of a predetermined number of said received impulses reflected from said discontinuities, and means responsive to the output of said counting means and to said received impulses for providing an indication of the ullage of said vessel.

References Cited in the file of this patent

UNITED STATES PATENTS

| | | |
|---|---|---|
| 2,156,519 | Walker | May 2, 1939 |
| 2,277,110 | Johnson | Mar. 24, 1942 |
| 2,472,249 | De Giers | June 7, 1949 |
| 2,507,859 | De Land | May 16, 1950 |
| 2,512,923 | Dippy | June 27, 1950 |